United States Patent [19]
Demarco

[11] Patent Number: 5,543,665
[45] Date of Patent: Aug. 6, 1996

[54] OPTICAL KEY AND LOCK CODE AUTHENTICATION

[76] Inventor: Vincent Demarco, 3802 Canon St., San Diego, Calif. 92020

[21] Appl. No.: 289,442

[22] Filed: Aug. 11, 1994

Related U.S. Application Data

[63] Continuation of Ser. No. 980,266, Nov. 23, 1992, abandoned.

[51] Int. Cl.⁶ ..................................................... E05B 47/00
[52] U.S. Cl. ..................................... 307/10.2; 340/825.31
[58] Field of Search .................... 340/825.31, 825.34; 307/10.1, 10.7, 10.5

[56] References Cited

U.S. PATENT DOCUMENTS

| | | | |
|---|---|---|---|
| 4,139,889 | 2/1979 | Ingels | 364/460 |
| 4,673,914 | 6/1987 | Lee | 307/10.2 |
| 4,918,955 | 4/1990 | Kimura et al. | 70/277 |
| 4,985,694 | 1/1991 | Sunami | 340/426 |
| 5,132,661 | 7/1992 | Pinnow | 70/277 |
| 5,254,842 | 9/1993 | Power et al. | 307/10.2 |

Primary Examiner—Peter S. Wong
Assistant Examiner—Aditya Krishnan
Attorney, Agent, or Firm—Gilliam, Duncan, Harms

[57] ABSTRACT

In an electrical switch which includes a key for its operation. The key includes a code which is specific to a specific switch. The switch includes illumination means for illuminating the key carried code, a scanning device for reading the key code, electronic circuits for comparing the key code with the proper key code for that specific lock, and responding to a correct key by allowing the switch to close electrically or to an incorrect key which prevents the switch from closing electrically and can turn on an alarm.

4 Claims, 1 Drawing Sheet

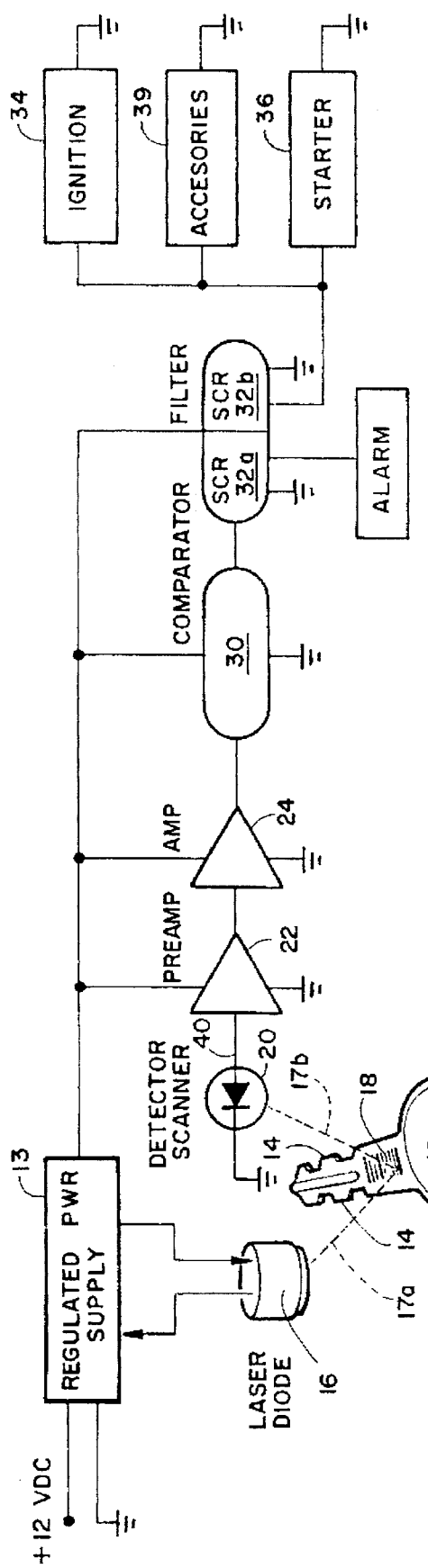
FIGURE 1
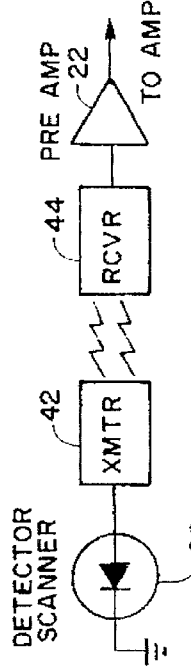
FIGURE 2
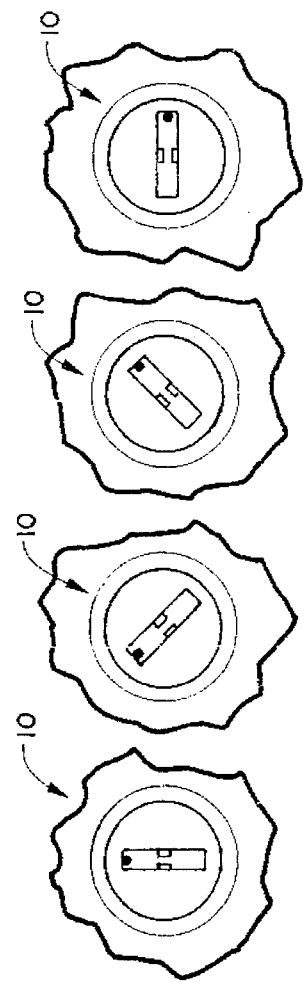
FIGURE 3a  FIGURE 3b  FIGURE 3c  FIGURE 3d
FIGURE 4

OPTICAL KEY AND LOCK CODE AUTHENTICATION

This is a continuation of application(s) Ser. No. 07/980,266 filed on Nov. 23, 1992, now abandoned.

BACKGROUND OF THE INVENTION

The invention is directed to a key lock and more particularly to a cylinder type key lock for switching selected electrical circuits of an automotive vehicle and includes internal optics for identifying the correct key for operating a specific vehicle's lock and electrical systems or identifying a key as an incorrect key and preventing operation of a vehicle's lock and electrical system.

Locks have been around since at least early Egypt. Cylinder locks which are operable with serrated single or double sided keys have been around since the mid eighteen hundreds and have continued to improve since their first discovery and use. This type of lock is very well known and has proven to be a very successful key/lock system.

Modernly, electronic locks have come into existence. Generally these locks are of the push button type wherein a coded sequence of push buttons opens the lock.

Combinations of cylinder locks and electronic locks exist which utilize both a conventional tumbler lock in cooperation with an electronic lock.

Locks are used in combination with levers to secure and release doors, turn on devices, and any other conceivable use for securing specific items from unwanted use or operation.

Cylinder locks and to some extent electronic locks have been successfully used as a means for preventing unwanted entry and use of automotive vehicles, as ignition switches for operating the electrical system and for starting the vehicle after the ignition has been switched on.

Presently unwanted entry and use of vehicles by joy riders and thieves occurs at a continuing increased frequency. The joy rider or thief either destroys the door lock or "jimmies" the door lock system to gain entry and then pulls the tumbler from the ignition lock, destroys the lock housing, jumps the wiring to turn on the ignition system and then jump wires the starter system to start and drive the vehicle away.

There is a continuing need to provide an ignition, fuel and starter system locking system that will reduce or prevent the theft of vehicles.

There has not been a decisive advancement to vehicle locking systems to substantially prevent vehicle theft until the emergence of the present invention.

SUMMARY OF THE INVENTION

The lock system of the present invention is directed to a conventional key operated cylinder tumbler lock switch for the ignition, fuel and starter systems of a vehicle. The lock switch of the present invention can lock and operate a switch between "off", "on, accessory "on" and starter momentary operation in a conventional expected manner. The present invention may be utilized alone as a means for energizing the ignition, fuel and starting system of a vehicle.

The lock switch system of the present invention comprises a cylinder lock switch with an optical system for determining the correct key for its operation that includes a laser diode which is turned on when the key is turned to an "on" (vehicle electrical system "on" and with fuel and ignition remaining "OFF") position in the lock illuminating an optical code carried by the key. The key includes a specific code on the outer surface thereof or a code consisting of apertures through the key which is assigned to that specific vehicle's ignition lock switch. An optical reader receives the laser light reflected from the key code. The detected code from the key is converted to an electrical signal, digital or analog, amplified and compared with the actual vehicle lock switch code stored in a buffer or register to verify if the correct code is present. If the code from the key matches the vehicle code in the buffer or register, then the vehicle's total electrical system is energized in a normal and expected manner as the key is turned in the lock switch. If on the other hand, the key has no code or a different code than the assigned vehicle lock code, the vehicle electrical system will remain off to the extent that the vehicle will not start even though the key may mechanically turn the lock. In the event of the insertion and operation of an improper key, a vehicle alarm is sounded, if desired, to draw attention to the vehicle.

Because the buffer or register decoder system can be positioned remote from the vehicle lock switch, a vehicle thief would not have easy access to the system to attempt overriding the lock switch system by jumping the necessary wires to turn on the ignition and start the vehicle.

It should be understood that the coded signal from the lock of the present invention can be transmitted by wire, fibre optic or radio waves or the like to a remotely located decoder to determine whether or not to energize the electrical system of the vehicle such that the vehicle may be operated.

An object of this invention is to provide a vehicle electrical energizing locking system that decreases the risk of vehicle theft.

An other object of this invention is to provide a coded locking system that optically reads a code from the key being used to turn on the electrical systems of a vehicle by determining whether or not the key is the correct key to operate a specific vehicle's ignition locking system.

Yet another object of this invention is to provide a lock system which requires a key with a specific optic code to cause the lock switch to operate as expected.

Other objects and features of the invention will become apparent as the drawings which follow are understood by reading the corresponding description thereof.

BRIEF DESCRIPTION OF THE DRAWING FIGURES

FIG. 1 is a schematic showing of the components of the optical locking system of the invention;

FIG. 2 is a second embodiment of the key for operating the system of FIG. 1 depicting a fibre optic fiber for transmitting the code pattern from the key to a remote location;

FIGS. 3a is front view of a cylinder lock in a first "off" position;

FIG. 3b is a front view of a cylinder lock in a second accessory position;

FIG. 3c is a front view of a cylinder lock in a third electrical system "on" position;

FIG. 3d depict a plan view of the operating sequence of a cylinder lock in a fourth energize starter position; and FIG. 4 is a second embodiment of circuit of FIG. 1.

DETAILED DESCRIPTION OF THE PREFERRED EMBODIMENT

Referring now to the drawing figures, a front view of a cylindrical type key ignition lock switch 10 for a vehicle is shown in drawing FIGS. 3a–3d which from left to right in the drawings depict "off", "accessories on", "vehicle electrical and optical scanning system "on" and spring return "starter energize" respectively. The lock switch operates with a conventional type key 12 as shown in drawing FIGS. 1 and 2 which in addition to the normal serrated tumbler pin engaging outer surfaces 14 includes a code thereon. The key of drawing FIG. 1 has a code sequence on the outer surface thereof while the key of drawing FIG. 2 has a series of apertures through the key forming the code sequence. It should be understood that any type and suitable code sequence carried by a key can be employed to practice this invention. The only requirement for the coded sequence is that it can be read with an optical scanner which is well known in the optical scanning art, as for example, the scanner systems utilized to identify grocery products for automatic pricing thereof.

When the key 12 is inserted into the lock switch 10 in a conventional manner, if mechanically correct the key can be turned clockwise to the location shown in drawing FIG. 3b whether or not the key is optically coded for the vehicle. When the key 12 is in the drawing FIG. 3b position the optical scanning system of FIG. 1 of the invention is energized via a regulated power supply 13 powered by the vehicle battery (not shown) or a self contained battery (not shown).

A laser diode or light emitting diode (LED) which will produce sufficient light for use with optical scanners is illuminated directing a beam of light 17a onto or through the code 18 of the key 12 or 12a respectively. The light pattern 17b reflected from the coded area of the key is detected by an optical scanner (detector) 20 well known in the scanning art.

The scanner (detector) converts the light pattern received into a digital or analog electrical signal representative of the code 18. That electrical signal from the detector is amplified by pre-amplifier 22 and amplifier 24.

The amplified signal is now fed into a comparator 30 comprising a buffer or register or equivalent thereto commonly known in the electronic art where the signal is compared with the proper vehicle code pre-stored in the comparator or register.

If the code is correct, the comparator produces a binary 1 output which causes a latching solenoid or SCR 32a to go to a closed state shown in phantom in drawing FIG. 1 connecting the ignition, starter electrical and accessory systems 34, 36 and 39 respectively to the vehicle power supply (battery). If the code is incorrect, the comparator output goes to a binary 0 and the solenoid or SCR 32a remains in an open state as shown in FIG. 1. The binary 0 can be used to energize a second solenoid or SCR 32b energizing an alarm to bring attention to the vehicle denoting unauthorized attempt use of the vehicle.

It should be understood that the light pattern from the code on the key can be transmitted to the scanner 20 which is positioned at a remote location by means of a optic fibre 38, see drawing FIG. 2, or the electrical output from the detector can be transmitted through a long wire 40, see FIG. 1, or wireless transmitted by a transmitter 42 to a receiver 44 to the pre-amplifier 22 positioned remote from the lock 10 and detector 20, see drawing FIG. 4.

If the key 12 is the wrong coded key for the lock but has the proper serrated edges 14 to mechanically operate the lock tumblers, the lock may be turned through all the positions (accessaries on, ignition on, electrical and starter operate) shown in drawing FIGS. 3b–3d and the optical scanning system will still prevent the vehicle ignition, electric fuel pump or starter from operating and optionally an alarm will sound.

If, however, the key is properly serrated to operate the tumblers and the key is properly coded for the lock in which it is inserted the optical detecting system will allow the ignition and starter to operate in an expected normal manner as explained above.

While there has been shown and described preferred embodiments of the improved key coded lock switch system in accordance with the invention, it will be appreciated that many changes and modifications may be made therein without, however, departing from the essential spirit thereof.

What is claimed is:

1. An optical reading system for determining if a key coded with an optical pattern for use with a specific lock is the correct key for operating that specific lock, which comprises:

a code pattern of discrete areas of varying reflectivity carried by a key on an impervious outer key surface, said code pattern being independent of the physical configuration of said key, said code pattern identifying the specific lock which said key is intended to operate;

illumination means for illuminating said code pattern carried by said key;

scanning means for receiving a varying light level pattern reflected from said code pattern;

decoding means positioned remote from said scanning means for determining if the reflected light level pattern reflected by the code pattern on said key corresponds to the preset code for the specific lock; and means for controlling the operability of the specific lock in response to the code pattern scanned;

whereby when the scanned pattern matches the lock preset pattern said switch will operate and when the scanned pattern does not match the lock preset pattern the switch will not operate.

2. The system according to claim 1 wherein the reflected light from said scanned pattern is transmitted to said scanner by fiber optic means.

3. The system according to claim 1 further including a transmitter for transmitting a signal corresponding to said scanned pattern to a remote receiver where said signal is sent to said decoding means for decoding.

4. An optical reading system for determining if a key coded with an optical pattern for use with a specific lock is the correct key for operating that specific lock, which comprises:

a code pattern comprising a predetermined pattern of areas of different reflectivity on an outer surface of a key, said code pattern identifying a particular lock which said key is intended to operate;

illumination means for illuminating said code pattern;

scanning means for receiving varying light levels reflected from said code pattern on said key and generating a corresponding coded electrical signal;

wireless transmitter means for transmitting said coded electrical signal to a location remote from said scanning means;

receiving means for receiving said coded electrical signal from said wireless transmitter means;

means for determining if the coded electrical signal is the correct code for said particular lock; and means for controlling the operability of the specific lock in response to the code pattern scanned;

whereby when said coded electrical signal is correct for said particular lock the lock will operate and when said coded electrical signal is not the correct code for said particular lock the lock will not operate.

* * * * *